United States Patent
Han et al.

(10) Patent No.: US 12,482,606 B2
(45) Date of Patent: Nov. 25, 2025

(54) MULTILAYERED CERAMIC CAPACITOR

(71) Applicant: SAMSUNG ELECTRO-MECHANICS CO., LTD., Suwon-si (KR)

(72) Inventors: Sung Han, Suwon-si (KR); Sunghoon Kim, Suwon-si (KR); Mi-Geum Kim, Suwon-si (KR); Sangik Cho, Suwon-si (KR); Hoseung Jang, Suwon-si (KR); Kipyo Hong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 113 days.

(21) Appl. No.: 18/513,984

(22) Filed: Nov. 20, 2023

(65) Prior Publication Data

US 2024/0395463 A1     Nov. 28, 2024

(30) Foreign Application Priority Data

May 23, 2023   (KR) .................. 10-2023-0066101
Sep. 1, 2023   (KR) .................. 10-2023-0116184

(51) Int. Cl.
*H01G 4/232* (2006.01)
*H01G 4/30* (2006.01)

(52) U.S. Cl.
CPC ............. *H01G 4/2325* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 10,903,009 B2 * | 1/2021 | Seo | H01G 4/30 |
| 11,848,158 B2 * | 12/2023 | Kim | H01G 4/2325 |
| 2020/0058443 A1 * | 2/2020 | Kang | H01G 4/30 |

(Continued)

FOREIGN PATENT DOCUMENTS

| | | |
|---|---|---|
| JP | 2020-141016 A | 9/2020 |
| KR | 10-1891141 B1 | 8/2018 |
| KR | 20230052711 A * | 4/2023 |

OTHER PUBLICATIONS

Translation of KR '711 (Year: 2023).*

(Continued)

*Primary Examiner* — Dion R. Ferguson
(74) *Attorney, Agent, or Firm* — Morgan Lewis & Bockius LLP

(57) ABSTRACT

A multilayer ceramic capacitor may include a ceramic body, a plurality of first internal electrodes and a plurality of second internal electrodes disposed inside the ceramic body, a first external electrode disposed outside the ceramic body and connected to the plurality of first internal electrodes, and a second external electrode disposed outside the ceramic body and connected to the plurality of second internal electrodes, where the first external electrode may include, a first conductive carbon layer electrically connected to the plurality of first internal electrodes, and a first plated layer covering the first conductive carbon layer, and where the second external electrode may include, a second conductive carbon layer electrically connected to the plurality of second internal electrodes, and a second plated layer covering the second conductive carbon layer.

18 Claims, 7 Drawing Sheets

(56) References Cited

U.S. PATENT DOCUMENTS

2021/0090804 A1\* 3/2021 Park .................. H01G 4/232
2022/0028617 A1\* 1/2022 Sada .................. H01G 4/248
2024/0395463 A1\* 11/2024 Han ................... H01G 4/2325

OTHER PUBLICATIONS

How To Test Out That MLCC Is 100% Original Authentic?, GNS Components Limited, Jul. 8, 2019, <https://www.ictransistors.com/news/how-to-test-out-that-mlcc-is-100-original-aut-25046238.html (http://ko.gnscomponent.com/news/how-to-test-out-that-mlcc-is-100-original-aut-25305978.html)>.

\* cited by examiner

MULTILAYERED CERAMIC CAPACITOR

CROSS-REFERENCE TO RELATED APPLICATION

This application claims priority to and the benefit of Korean Patent Application No. 10-2023-0066101 filed in the Korean Intellectual Property Office on May 23, 2023, and Korean Patent Application No. 10-2023-0116184 filed in the Korean Intellectual Property Office on Sep. 1, 2023, the entire contents of which is incorporated herein by reference.

BACKGROUND

(a) Technical Field

The present disclosure relates to a multilayer ceramic capacitor.

(b) Description of the Related Art

Electronic components using ceramic materials include capacitors, inductors, piezoelectric elements, varistors, or thermistors. Among these ceramic electronic components, multilayer ceramic capacitors (MLCCs) may be used in various electronic devices due to their small size, high capacitance, and ease of mounting.

For example, multilayer ceramic capacitor may be used in a condenser in the form of a chip that is mounted on a substrate of various electronic products, such as an image device such as liquid crystal displays (LCDs), plasma display device panels (PDPs), organic light-emitting diodes (OLEDs), computers, personal portable terminals and smart phones, to charge and discharge electricity.

A multilayer ceramic capacitor may include internal electrodes disposed inside the ceramic body and external electrodes disposed outside the ceramic body and connected to the internal electrodes. The external electrode may be formed by dipping and blotting the ceramic body in a paste for forming the external electrode. If the external electrode is formed in this way, a thickness difference may occur depending on the location where the external electrode is formed due to the rheology characteristics of the conductive paste, causing a problem of deterioration of coverage. Furthermore, when a conductive metal is plated using such external electrodes as a seed, a reliability problem may occur due to penetration of the plating solution.

SUMMARY

The present disclosure attempts to provide a multilayer ceramic capacitor including external electrodes having a uniform thickness.

In addition, the present disclosure also attempts to provide a multilayer ceramic capacitor that can be designed to have a larger portion contributing to capacitance by reducing the volume of an external electrode without relative electrical loss.

However, the objective of the present disclosure is not limited to the aforementioned one, and may be extended in various ways within the spirit and scope of the present disclosure.

A multilayer ceramic capacitor may include a ceramic body including a first surface and a second surface facing each other in a first direction, a third surface and a fourth surface facing each other in a second direction and connecting the first surface and the second surface, a fifth surface and a sixth surface facing each other in a third direction and connecting the first surface and the second surface, a plurality of first internal electrodes and a plurality of second internal electrodes disposed inside the ceramic body, a first external electrode disposed on the ceramic body and connected to the plurality of first internal electrodes, the first external electrode may include a first conductive carbon layer connected to the plurality of first internal electrodes on the first surface of the ceramic body and extending to at least one surface among the third surface, the fourth surface, the fifth surface, and the sixth surface, and a first plated layer covering the first conductive carbon layer, and a second external electrode disposed on the ceramic body and connected to the plurality of second internal electrodes, the second external electrode may include, a second conductive carbon layer connected to the plurality of second internal electrodes on the second surface of the ceramic body and extending to at least one surface among the third surface, the fourth surface, the fifth surface, and the sixth surface, and a second plated layer covering the second conductive carbon layer.

The first conductive carbon layer and the second conductive carbon layer may include one or more selected from graphite, graphene, carbon nanotube, fullerene, and carbon black.

The first plated layer may include a first layer covering the first conductive carbon layer, a second layer covering a first plated layer, and a third layer covering the second layer.

The first layer may include copper (Cu), the second layer may include nickel (Ni), and the third layer may include tin (Sn).

The second plated layer may include a first layer covering the second conductive carbon layer, a second layer covering a first plated layer, and a third layer covering the second layer.

The first layer may include copper (Cu), the second layer may include nickel (Ni), and the third layer may include tin (Sn).

In addition, a thickness of the first conductive carbon layer may be 0.1 µm or more and 20 µm or less, and a thickness of the second conductive carbon layer may be 0.1 µm or more and 20 µm or less.

The first conductive carbon layer has a portion having a first thickness $t1$ and contacting the first surface of the ceramic body, a portion having a second thickness $t2$ and contacting the fifth surface, and a portion having a third thickness $t3$ and contacting the sixth surface, where $0 < t1 \leq 10 \ast t2$ and $0 < t1 \leq 10 \ast t3$.

The second conductive carbon layer has a portion having a first thickness $t1'$ and contacting the second surface of the ceramic body, a portion having a second thickness $t2'$ and contacting the fifth surface, and a portion having a third thickness $t3'$ and contacting the sixth surface, where $0 < t1' \leq 10 \ast t2'$ and $0 < t1' \leq 10 \ast t3'$.

The first conductive carbon layer, the second conductive carbon layer or both may include fullerene.

A multilayer ceramic capacitor may include a ceramic body including a first surface and a second surface facing each other in a first direction, a third surface and a fourth surface facing each other in a second direction and connecting the first surface and the second surface, a fifth surface and a sixth surface facing each other in a third direction and connecting the first surface and the second surface, a plurality of first internal electrodes and a plurality of second internal electrodes disposed inside the ceramic body, a first external electrode disposed on the ceramic body and connected to the plurality of first internal electrodes, the first external electrode may include a first conductive carbon layer disposed on the first surface of the ceramic body and connected to the plurality of first internal electrodes, and a first metal layer disposed on the fifth surface of the ceramic body and having an edge toward the first surface, the edge contacting the first conductive carbon layer, and a second external electrode disposed on the ceramic body and connected to the plurality of second internal electrodes, the second external electrode may include a second conductive carbon layer disposed on the second surface of the ceramic body and connected to the plurality of second internal electrodes, and a second metal layer disposed on the fifth surface of the ceramic body and having an edge toward the second surface, the edge contacting the second conductive carbon layer.

The first conductive carbon layer and the second conductive carbon layer may include one or more selected from graphite, graphene, carbon nanotube, fullerene, and carbon black.

The first external electrode may further include a third plated layer covering the first conductive carbon layer and the first metal layer, and the second external electrode may further include a fourth plated layer covering the second conductive carbon layer and the second metal layer.

The first external electrode may further include a third metal layer disposed on the sixth surface of the ceramic body and having an edge toward the first surface, the edge contacting the first conductive carbon layer, and the second external electrode may further include a fourth metal layer disposed on the sixth surface of the ceramic body and having an edge toward the second surface, the edge contacting the second conductive carbon layer.

In addition, the third metal layer may be covered by the third plated layer, and the fourth metal layer may be covered by the fourth plated layer.

The third plated layer may include a first layer covering the first conductive carbon layer, a second layer covering a first plated layer, and a third layer covering the second layer.

The first layer may include copper (Cu), the second layer may include nickel (Ni), and the third layer may include tin (Sn).

The fourth plated layer may include a first layer covering the second conductive carbon layer, a second layer covering a first plated layer, and a third layer covering the second layer.

The first layer may include copper (Cu), the second layer may include nickel (Ni), and the third layer may include tin (Sn).

The first conductive carbon layer, the second conductive carbon layer or both may include fullerene.

the first external electrode may further include a third plated layer covering the first conductive carbon layer and the first metal layer, the third plated layer comprising a first layer covering the first conductive carbon layer, a second layer covering the first layer, and a third layer covering the second layer, and a third metal layer disposed on the sixth surface of the ceramic body and having an edge toward the first surface, the edge contacting the first conductive carbon layer, the third metal layer is covered by the third plated layer. The second external electrode may further include a fourth plated layer covering the second conductive carbon layer and the second metal layer, the fourth plated layer comprising a first layer covering the second conductive carbon layer, a second layer covering the first layer, and a third layer covering the second layer, and a fourth metal layer disposed on the sixth surface of the ceramic body and having an edge toward the second surface, the edge contacting the second conductive carbon layer, the fourth metal layer is covered by the fourth plated layer.

According to a multilayer ceramic capacitor according to an embodiment, the external electrode is formed in a uniform thickness, and the coverage of a metal electrode of an edge or a corner portion may be improved.

In addition, according to a multilayer ceramic capacitor of an embodiment, a portion contributing to capacitance may be enlarged by reducing the volume of an external electrode without relative electrical loss.

DETAILED DESCRIPTION OF THE EMBODIMENTS

Figure 1:
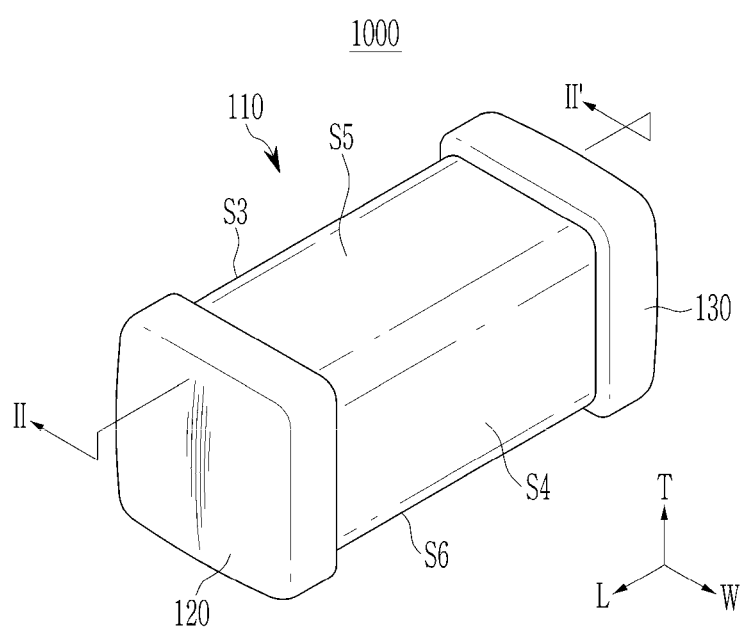
FIG. 1 is a perspective view schematically illustrating a multilayer ceramic capacitor according to an embodiment.

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. In addition, some constituent elements are exaggerated, omitted, or briefly illustrated in the added drawings, and sizes of the respective constituent elements do not reflect the actual sizes.

The accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It will be understood that when an element such as a layer, film, region, area, or substrate is referred to as being "on" or "above" another element, it can be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

Throughout the specification, it should be understood that the term "include", "comprise", "have", or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Furthermore, throughout the specification, "connected" does not only mean when two or more elements are directly connected, but also when two or more elements are indirectly connected through other elements, and when they are physically connected or electrically connected, and further, it may be referred to by different names depending on a position or function, and may also be referred to as a case in which respective parts that are substantially integrated are linked to each other.

Figure 2:
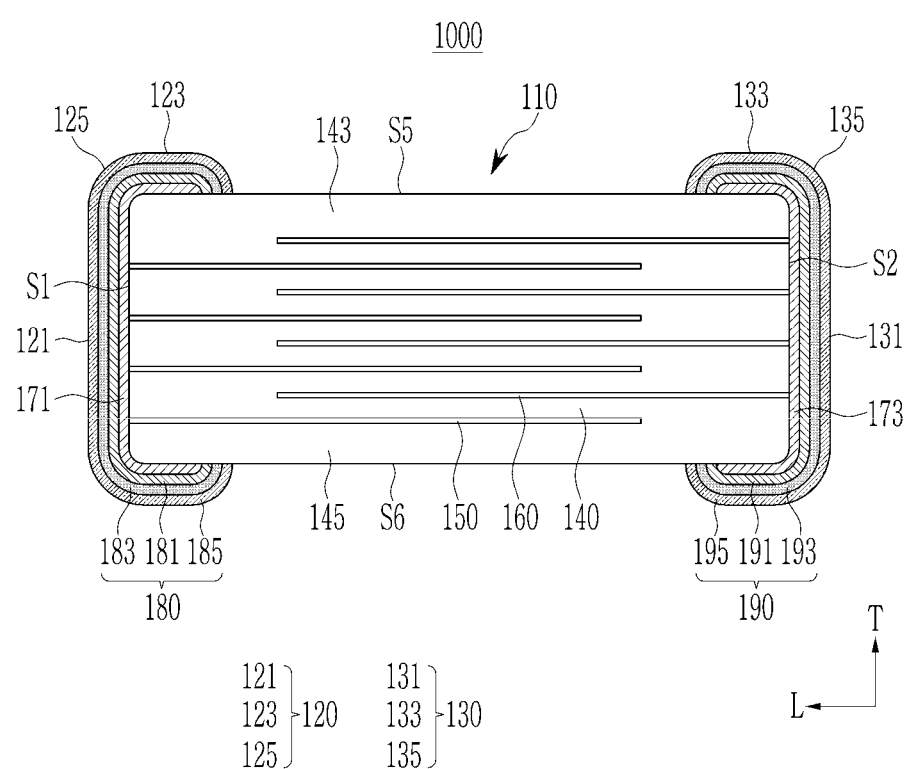
FIG. 2 is a cross-sectional view taken along line II-II' of FIG. 1.
Figure 3:
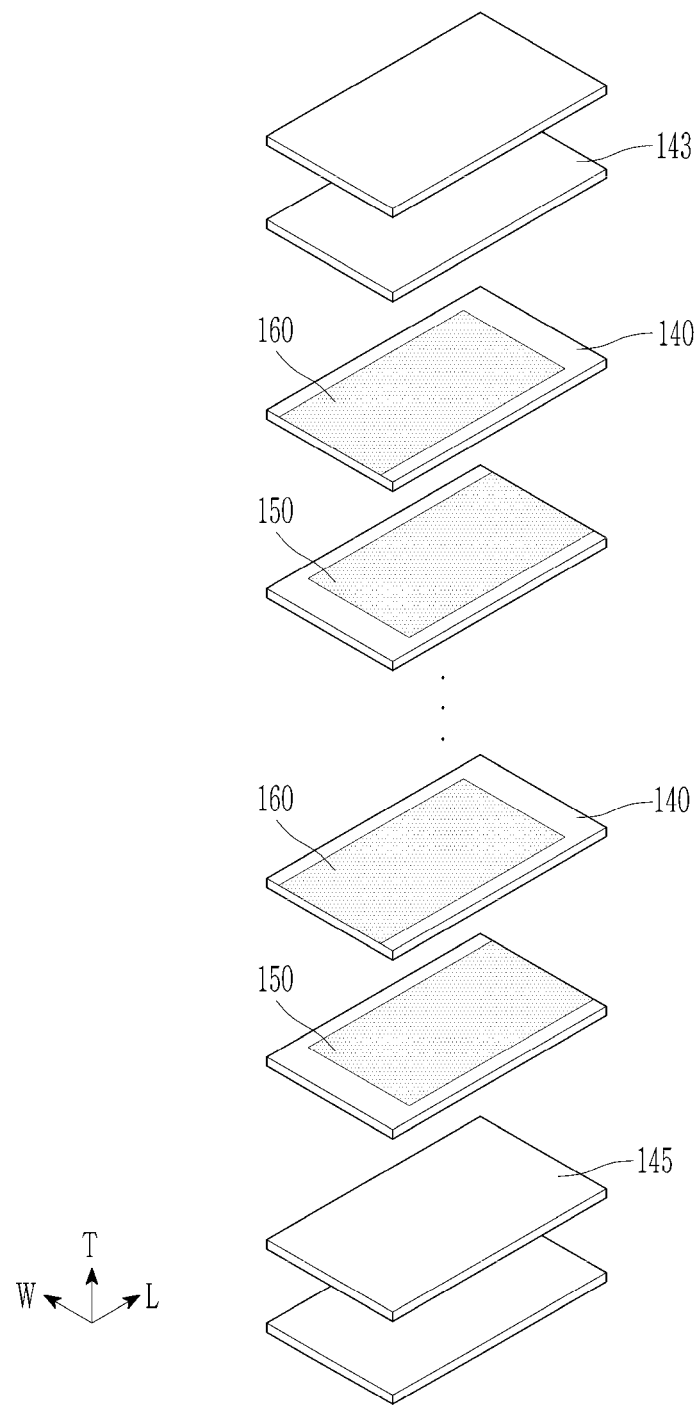
FIG. 3 is an exploded perspective view illustrating a stacking structure of an internal electrode of the multilayer ceramic capacitor of FIG. 1.

FIG. 1 is a perspective view schematically illustrating a multilayer ceramic capacitor according to an embodiment. FIG. 2 is a cross-sectional view taken along line II-II' of FIG. 1. FIG. 3 is an exploded perspective view illustrating a stacking structure of an internal electrode of a multilayer ceramic capacitor of FIG. 1.

Referring to FIG. 1, FIG. 2 and FIG. 3, a multilayer ceramic capacitor 1000 according to the present embodiment includes a ceramic body 110, a first external electrode 120, a second external electrode 130, a plurality of first internal electrodes 150 and a plurality of second internal electrodes 160.

First, for directions defined for describing the present embodiment, L-axis, W-axis, and T-axis shown in the drawings respectively indicates axes indicating a length direction, a width direction, and a thickness direction of the multilayer ceramic capacitor 1000.

The thickness direction (T-axis direction) may be a direction perpendicular to a wide surface (major surface) of sheet-like components. For example, the thickness direction (T-axis direction) may be used as the same concept as the direction in which dielectric layers 140 are stacked.

The length direction (L-axis direction) is a direction parallel to the wide surfaces (main surfaces) of the sheet-like components, and may be a direction that intersects (or is orthogonal to) the thickness direction (T-axis direction). For example, the length direction (L-axis direction) may be a direction in which the first external electrode 120 and the second external electrode 130 face each other.

The width direction (W-axis direction) is a direction parallel to the wide surface (main surface) of the sheet-like components, and may be a direction that simultaneously intersects (or is orthogonal to) the thickness direction (T-axis direction) and the length direction (L-axis direction).

The ceramic body 110 may have a substantially hexahedral shape, but the present embodiment is not limited thereto. Due to contraction during sintering, the ceramic body 110 may have a substantially hexahedral shape, although not a perfect hexahedral shape. For example, the ceramic body 110 has a substantially cuboidal shape, but corner or vertex portions may have a rounded shape.

In the present embodiment, for convenience of description, surfaces facing each other in the length direction (L-axis direction) are defined as a first surface S1 and a second surface S2, surfaces facing each other in the width direction (W-axis direction) and connecting the first surface S1 and the second surface S2 are defined as a third surface S3 and a fourth surface S4, and surfaces facing each other in the thickness direction (T-axis direction) and connecting the first surface S1 and the second surface S2 are defined as a fifth surface S5 and a sixth surface S6.

Therefore, a first direction, which is a direction in which the first surface S1 and the second surface S2 face each other, may be the length direction (L-axis direction), and a second direction and a third direction that are perpendicular to the first direction and perpendicular to each other may be the thickness direction (T-axis direction) and the width direction (W-axis direction), respectively, or the width direction (W-axis direction) and the thickness direction (T-axis direction), respectively.

A length of the ceramic body 110 may mean, based on an optical microscope or scanning electron microscope (SEM) image of a cross-section in the length direction (L-axis direction)-the thickness direction (T-axis direction) at a center of the width direction (W-axis direction) of the ceramic body 110, a maximum value of lengths of a plurality of line segments that connect two outermost boundary lines facing each other in the length direction (L-axis direction) of the ceramic body 110 shown in the above cross-sectional image and are parallel to the length direction (L-axis direction). Meanwhile, the length of the ceramic body 110 may mean a minimum value of lengths of a plurality of line segments that connect two outermost boundary lines facing each other in the length direction (L-axis direction) of the ceramic body 110 shown in the above-mentioned cross-sectional image and are parallel to the length direction (L-axis direction), respectively. Alternatively, the length of the ceramic body 110 may mean an arithmetic average value of lengths of at least two of a plurality of line segments that connect two outermost boundary lines facing each other in the length direction (L-axis direction) of the ceramic body 110 shown in the above cross-sectional image and are parallel to the length direction (L-axis direction).

A thickness of the ceramic body 110 may mean, based on an optical microscope or scanning electron microscope (SEM) image of a cross-section in the length direction (L-axis direction)-the thickness direction (T-axis direction) at a center of the width direction (W-axis direction) of the ceramic body 110, a maximum value of lengths of a plurality of line segments that connect two outermost boundary lines facing each other in the thickness direction (T-axis direction) of the ceramic body 110 shown in the above cross-sectional image and are parallel to the thickness direction (T-axis direction). Meanwhile, the thickness of the ceramic body 110 may mean a minimum value of lengths of a plurality of line segments that connect two outermost boundary lines facing each other in the thickness direction (T-axis direction) of the ceramic body 110 shown in the above-mentioned cross-sectional image and are parallel to the thickness direction (T-axis direction), respectively. On the other hand, the thickness of the ceramic body 110 may mean an arithmetic average value of lengths of at least two line segments among a plurality of line segments that connect two outermost boundary lines facing each other in the thickness direction (T-axis direction) of the ceramic body 110 shown in the above-mentioned cross-sectional image and parallel to the thickness direction (T-axis direction), respectively.

A width of the ceramic body 110 may mean, based on an optical microscope or scanning electron microscope (SEM) image of a cross-section in the length direction (L-axis direction)-the width direction (W-axis direction) at a center of the thickness direction (T-axis direction) of the ceramic body 110, a maximum value of lengths of a plurality of line segments that connect two outermost boundary lines facing each other in the width direction (W-axis direction) of the ceramic body 110 shown in the above cross-sectional image and are parallel to the width direction (W-axis direction). Meanwhile, the width of the ceramic body 110 may mean a minimum value of lengths a plurality of line segments that connect two outermost boundary lines facing each other in the width direction (W-axis direction) of the ceramic body 110 shown in the above-mentioned cross-sectional image and are parallel to the width direction (W-axis direction), respectively. On the other hand, the width of the ceramic body 110 may mean an arithmetic average value of lengths of at least two line segments among a plurality of line segments that connect two outermost boundary lines facing each other in the width direction (W-axis direction) of the ceramic body 110 shown in the above-mentioned cross-sectional image and are parallel to the width direction (W-axis direction), respectively.

The ceramic body 110 may include a plurality of dielectric layers 140 stacked in the thickness direction (T-axis direction). A boundary between the dielectric layers 140 may be indistinct. For example, the boundary between the dielectric layers 140 may be difficult to confirm without using a scanning electron microscope (SEM), and the plurality of dielectric layers 140 may look as an integral structure.

The first internal electrode 150 and the second internal electrode 160 may be alternately stacked interposing the dielectric layer 140. Such a stacking structure may be repeated within the ceramic body 110, and the internal electrode closest to the fifth surface S5 and the sixth surface S6 of the ceramic body 110 may be the first internal electrode 150 and may be the second internal electrode 160.

The first internal electrode 150 and the second internal electrode 160 have different polarities, and may be electrically insulated from each other by the dielectric layer 140 disposed therebetween.

The first internal electrode 150 and the second internal electrode 160 may be disposed to be offset from each other in the length direction (L-axis direction) interposing the dielectric layer 140. An end portion of the first internal electrode 150 may be exposed through the first surface S1 of the ceramic body 110, and an end portion of the second internal electrode 160 may be exposed through the second surface S2 of the ceramic body 110. The end portion of the first internal electrode 150 exposed from the first surface S1 of the ceramic body 110 may be connected to the first external electrode 120. The end portion of the second internal electrode 160 exposed from the second surface S2 of the ceramic body 110 may be connected to the second external electrode 130.

The first internal electrode 150 and the second internal electrode 160 may be formed by printing a conductive paste containing a conductive metal on the surface of the dielectric layer 140. For example, internal electrodes may be formed by printing a conductive paste containing nickel (Ni) or a nickel (Ni) alloy on the surface of the dielectric layer by screen printing or gravure printing. However, the present embodiment is not limited thereto.

For example, an average thickness of the first internal electrode 150 and the second internal electrode 160 may be generally 0.1 μm or more and 2 μm or less.

According to the above configuration, when a voltage is applied to the first external electrode 120 and the second external electrode 130, charges are accumulated between the first internal electrode 150 and the second internal electrode 160 that face each other. That is, a capacitance may be obtained between the first internal electrode 150 electrically connected to the first external electrode 120 and the second internal electrode 160 electrically connected to the second external electrode 130. A capacitance of the multilayer ceramic capacitor 1000 is proportional to an overlapping area of the first internal electrode 150 and the second internal electrode 160 that overlap each other along the thickness direction (T-axis direction).

In other words, the multilayer ceramic capacitor 1000 may include an active region and a margin region. The active region may refer to a region where the first internal electrode 150 and the second internal electrode 160 overlap along the thickness direction (T-axis direction), and the margin region may refer to a region between the first surface S1 of the ceramic body 110 and the active region and a region between the second surface S2 of the ceramic body 110 and the active region.

The multilayer ceramic capacitor 1000 is classified based on its length and width. Therefore, even in multilayer ceramic capacitors having the same length or width, the size of the ceramic body may vary according to the thickness of the external electrode. That is, a multilayer ceramic capacitor having a thinner external electrode may have a larger ceramic body than a multilayer ceramic capacitor having a thicker external electrode. A larger ceramic body may mean that the above-described active area is larger, which in turn may mean a larger capacitance. As a result, capacitance may increase as the external electrode of the multilayer ceramic capacitor becomes thinner. In the present embodiment, by using the conductive carbon layer as a seed layer for plating growth when forming the external electrode of the multilayer ceramic capacitor, the thickness of the external electrode may be thinned, and a corresponding advantageous effect may be obtained. This will be explained in more detail below.

A first cover layer 143 and a second cover layer 145 may be disposed outside of the active region in the thickness direction (T-axis direction).

The first cover layer 143 is disposed between the fifth surface S5 of the ceramic body 110 and the internal electrode closest thereto. The second cover layer 145 is disposed between the sixth surface S6 of the ceramic body 110 and the internal electrode closest thereto.

That is, in the ceramic body 110, the first cover layer 143 may be disposed above an uppermost internal electrode, and the second cover layer 145 may be disposed below a lowermost internal electrode. The first cover layer 143 and the second cover layer 145 may have the same composition as the dielectric layer 140. The first cover layer 143 and the second cover layer 145 may be formed by stacking one or more dielectric layers on each of an outer surface of an uppermost internal electrode and an outer surface of a lowermost internal electrode.

The first cover layer 143 and the second cover layer 145 may serve to prevent damage to the first internal electrode 150 and the second internal electrode 160 due to physical or chemical stress.

The dielectric layer 140 may include a ceramic material having a high permittivity. For example, the ceramic material may include dielectric ceramic that contains components such as $BaTiO_3$, $CaTiO_3$, $SrTiO_3$, or $CaZrO_3$, and the like. In addition, an auxiliary component, such as manganese (Mn) compounds, iron (Fe) compounds, chromium (Cr) compounds, cobalt (Co) compounds, and nickel (Ni) compounds may be further included to these components. For example, $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$, and the like in which $BaTiO_3$ in which calcium (Ca), zirconium (Zr), and the like are partially dissolved may be examples of the dielectric layer, the present disclosure is not limited thereto.

In addition, at least one of ceramic additives, organic solvents, plasticizers, binders, and dispersants may be further included in the dielectric layer 140. The ceramic additive may be, for example, a transition metal oxide or carbide, a rare earth element, magnesium (Mg), aluminum (Al), and the like.

For example, the average thickness of the dielectric layer 140 may be 0.1 μm to 10 μm, but the present embodiment is not limited thereto.

The first external electrode 120 and the second external electrode 130 are provided on the exterior of the ceramic body 110.

The first external electrode 120 may be disposed on the first surface S1 of the ceramic body 110, and may extend to the third surface S3, the fourth surface S4, the fifth surface S5, and the sixth surface S6. The second external electrode 130 may be disposed on the second surface S2 of the ceramic body 110, and may extend to the third surface S3, the fourth surface S4, the fifth surface S5, and the sixth surface S6. In another embodiment, the first external electrode 120 and the second external electrode 130 may extend to a portion of at least one surface among the fifth surface S5 and the sixth surface S6.

The first external electrode 120 includes a first connection portion 121, a first band portion 123 and a first corner portion 125.

The first connection portion 121 covers the first surface S1 of the ceramic body 110, and is a portion electrically connected to the exposed end portion of the plurality of first internal electrodes 150.

In another embodiment, the first connection portion 121 may cover a portion of the first surface S1 of the ceramic body 110.

The first band portion 123 extends from the first connection portion 121 to cover at least a portion of the third surface S3, the fourth surface S4, the fifth surface S5, and the sixth surface S6 of the ceramic body 110. The first band portion 123 may ensure that the first external electrode 120 is more strongly adhered to the ceramic body 110.

The first corner portion 125 may be a portion connecting the first connection portion 121 and the first band portion 123.

The second external electrode 130 includes a second connection portion 131, a second band portion 133, and a second corner portion 135, respectively.

The second connection portion 131 covers the second surface S2 of the ceramic body 110, and is a portion electrically connected to the exposed end portion of the plurality of second internal electrodes 160.

In another embodiment, the second connection portion 131 may cover a portion of the second surface S2 of the ceramic body 110.

The second band portion 133 extends from the second connection portion 131 to cover at least a portion of the third surface S3, the fourth surface S4, the fifth surface S5, and the sixth surface S6 of the ceramic body 110. The second band portion 133 may ensure that the second external electrode 130 is more strongly adhered to the ceramic body 110.

The second corner portion 135 may be a portion connecting the second connection portion 131 and the second band portion 133.

With respect to an optical microscope or scanning electron microscope (SEM) image of the length direction (L-axis direction)-thickness direction (T-axis direction) cross-section at a central portion in the width direction W of the multilayer ceramic capacitor 1000, in the multilayer ceramic capacitor 1000 shown in the above-mentioned cross-sectional image, the first connection portion 121 and the second connection portion 131 may have a shape generally parallel to the thickness direction (T-axis direction), the first band portion 123 and the second band portion 133 may have a shape generally parallel to the length direction (L-axis direction), and the first corner portion 125 and the second corner portion 135 may have a curved line shape. The above-described curved line shape may be a curved line shape having a tangent whose slope changes from a direction parallel to the thickness direction (T-axis direction) to a direction parallel to the length direction (L-axis direction) (or in opposite directions).

Compared to the first and second band portions 123 and 133 and the first and second connection portions 121 and 131, stress may be more concentrated in the first and second corner portions 125 and 135. Therefore, when the first and second corner portions 125 and 135 are damaged or cracks occur in the first and second corner portions 125 and 135, the damaged or cracked portion may become a path through which moisture penetrates. To prevent this problem, it is necessary to enhance mechanical properties by increasing the thicknesses of the first and second corner portions 125 and 135. According to the present embodiment, by forming the plated layer by using the conductive carbon layer as a seed layer for plating growth, the thicknesses of the first and second corner portions 125 and 135 may be increased and mechanical and electrical characteristics may be enhanced. This will be explained in more detail below.

Figure 4:
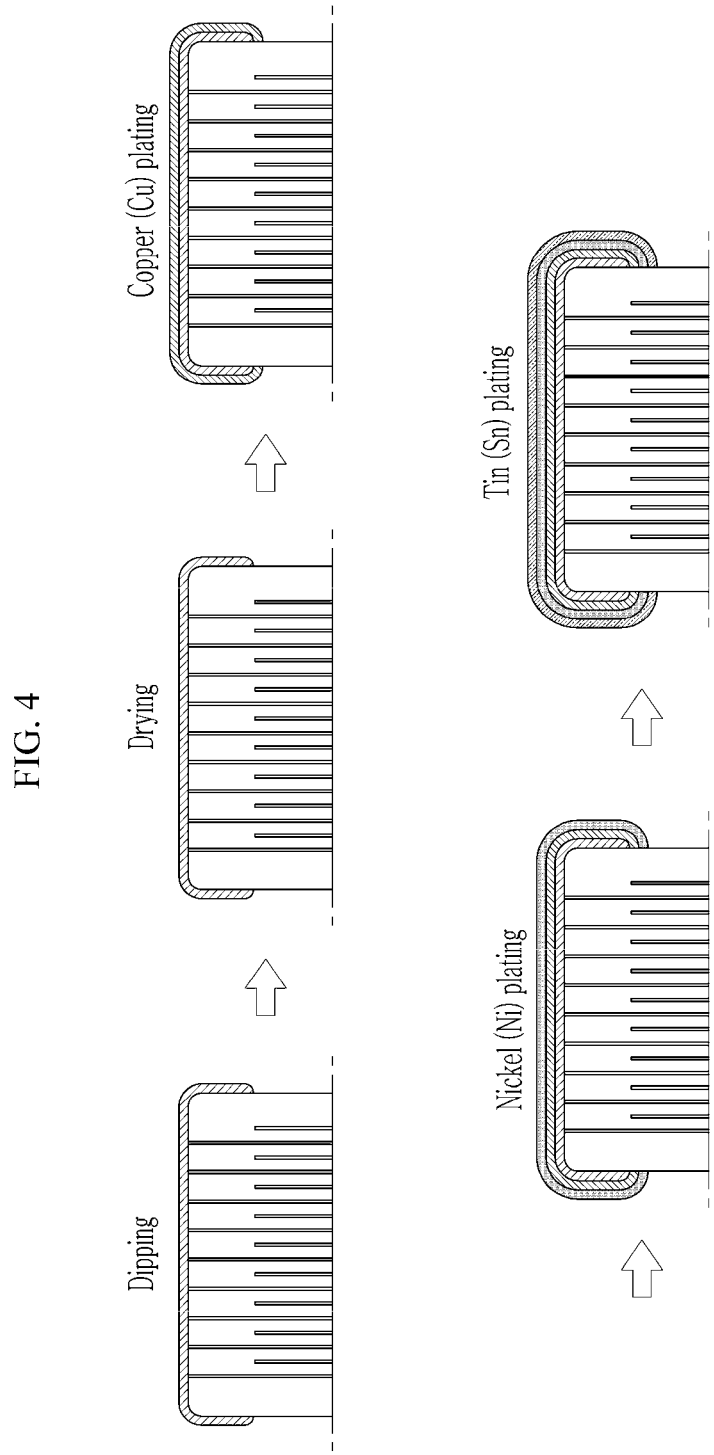
FIG. 4 is a drawing schematically illustrating a process of forming an external electrode of the multilayer ceramic capacitor of FIG. 1.

FIG. 4 is a drawing schematically illustrating a process of forming an external electrode of a multilayer ceramic capacitor of FIG. 1. For better understanding and ease of description, FIG. 4 shows a process of forming only one external electrode of a multilayer ceramic capacitor, but it may be understood that the other external electrode may be formed by the same process.

Referring to FIG. 1, FIG. 2, and FIG. 4, the first external electrode 120 may include a first conductive carbon layer 171 and a first plated layer 180, and the second external electrode 130 may include a second conductive carbon layer 173 and a second plated layer 190.

The first external electrode 120 may include the first conductive carbon layer 171 and the first plated layer 180 that covers the first conductive carbon layer 171. The first conductive carbon layer 171 is in direct contact with the ceramic body 110. For example, the first conductive carbon layer 171 may cover at least a portion of the first surface S1, the third surface S3, the fourth surface S4, the fifth surface S5, and the sixth surface S6 of the ceramic body 110.

The second external electrode 130 may include the second conductive carbon layer 173 and the second plated layer 190 that covers the second conductive carbon layer 173. The second conductive carbon layer 173 is in direct contact with the ceramic body 110. The second conductive carbon layer 173 may cover at least a portion of the second surface S2, the third surface S3, the fourth surface S4, the fifth surface S5, and the sixth surface S6 of the ceramic body 110.

The first conductive carbon layer 171 and the second conductive carbon layer 173 may include conductive carbon material. For example, the first conductive carbon layer 171 and the second conductive carbon layer 173 may include one or more of graphite, graphene, carbon nanotube, fullerene, and carbon black.

For example, by partially dipping a ceramic body into a dispersion containing a conductive carbon material, applying the dispersion according to the degree of dilution of the solution, and then heat drying and curing it at 170° C. for 10 minutes, a solid phase conductive carbon layer can be formed with a thickness of about 0.05 μm or more and 20 μm or less. Here, by setting the dilution ratio such that the content of the solid contents of the solution containing the conductive carbon material is approximately 1 wt % to 20 wt %, and by adjusting the number of repetitions of the dipping and drying process, the thickness of the conductive carbon layer may be adjusted.

The first plated layer 180 covers the first conductive carbon layer 171, and the second plated layer 190 covers the second conductive carbon layer 173.

The first plated layer 180 may be formed by directly plating a conductive metal on the first conductive carbon layer 171. That is, the first conductive carbon layer 171 may serve as a seed layer for plating. The second plated layer 190 may be formed by directly plating a conductive metal on the second conductive carbon layer 173. That is, the second conductive carbon layer 173 may serve as a seed layer for plating. Here, conductive metal includes nickel (Ni), copper (Cu), tin (Sn), palladium (Pd), platinum (Pt), gold (Au), silver (Ag), tungsten (W), titanium (Ti), lead (Pb), or the like, alone or an alloy thereof, but the present embodiment is not limited thereto.

Both the first plated layer 180 and the second plated layer 190 may comprise a plurality of layers. For example, the first plated layer 180 may include a first layer 181 covering the first conductive carbon layer 171, a second layer 183 covering the first layer 181, and a third layer 185 covering the second layer 183. The first layer 181 may include copper (Cu), the second layer 183 may include nickel (Ni), and the third layer 185 may include tin (Sn), but the present embodiment is not limited thereto.

In addition, the second plated layer 190 may include a first layer 191 covering the second conductive carbon layer 173, a second layer 193 covering the first layer 191, and a third layer 195 covering the second layer 193. The first layer 191 may include copper (Cu), the second layer 193 may include nickel (Ni), and the third layer 195 may include tin (Sn), but the present embodiment is not limited thereto.

Both a thickness of the first conductive carbon layer 171 and a thickness of the second conductive carbon layer 173 may be 0.1 μm or more and 20 μm or less.

The thickness of the first conductive carbon layer 171 and the thickness of the second conductive carbon layer 173 are measured with reference to an optical microscope or scanning electron microscope (SEM) image of a cross section in the length direction (L-axis direction)-thickness direction (T-axis direction) at the central portion in the width direction W of the multilayer ceramic capacitor 1000. Other methods and/or tools appreciated by one of ordinary skill in the art, even if not described in the present disclosure, may also be used. The thickness of the first conductive carbon layer 171 may be an arithmetic average value of thicknesses of the first conductive carbon layer 171 measured at five locations disposed apart from each other by an equal interval on a measurement position of the ceramic body 110 shown in the above-mentioned cross-sectional image. The above-mentioned measurement position may be the first surface S1, the third surface S3, the fourth surface S4, the fifth surface S5, the sixth surface S6, a corner where the third surface S3, and the first surface S1 of the ceramic body 110 meet, a corner where the fourth surface S4 and the first surface S1 meet, a corner where the fifth surface S5 and the first surface S1 meet, and a corner where the sixth surface S6 and the first surface S1 meet. The thickness of the second conductive carbon layer 173 may also be a value measured in the same way.

When the thickness of the first conductive carbon layer 171 and the second conductive carbon layer 173 are all less than 0.1 μm, it is difficult to stably form the first and second plated layers 180 and 190. That is, only partial nucleation may occur, and a continuous plated layer as a whole may not be formed. For example, when the thickness of the first conductive carbon layer 171 and the second conductive carbon layer 173 are all less than 0.1 μm, the first layers 181 and 191 containing copper (Cu) may not be sufficiently formed on the conductive carbon layers 171 and 173.

When the thickness of the first conductive carbon layer 171 or the thickness of the second conductive carbon layer 173 exceeds 20 μm, the thickness of the first external electrode 120 or the second external electrode 130 becomes excessively thick and the thickness decreasing effect according to the present embodiment may not be expected.

A thickness t1 of the first conductive carbon layer 171 on the first surface S1 of the ceramic body 110 may be 10 times or less of a thickness t2 of the first conductive carbon layer 171 on the fifth surface S5 of the ceramic body 110, and the thickness t1 of the first conductive carbon layer 171 on the first surface S1 of the ceramic body 110 may be 10 times or less of a thickness t3 of the first conductive carbon layer 171 on the sixth surface S6 of the ceramic body 110.

In other words, it may be that $0 < t1 \leq 10 \ast t2$ and $0 < t1 \leq 10 \ast t3$.

In the same way, a thickness t1' of the second conductive carbon layer 173 on the second surface S2 of the ceramic body 110 may be 10 times or less of a thickness t2' of the second conductive carbon layer 173 on the fifth surface S5 of the ceramic body 110, and the thickness t1' of the second conductive carbon layer 173 on the second surface S2 of the ceramic body 110 may be 10 times or less of a thickness t3' of the second conductive carbon layer 173 on the sixth surface S6 of the ceramic body 110.

In other words, it may be that $0 < t1' \leq 10 \ast t2'$ and $0 < t1' \leq 10 \ast t3'$.

That is, the first conductive carbon layer 171 disposed on the first surface S1 of the ceramic body 110 may be thicker than the first conductive carbon layer 171 disposed on the fifth surface S5 or the sixth surface S6, but the thickness ratio t1/t2 or t1/t3 may not exceed 10. In the same way, the second conductive carbon layer 173 disposed on the second surface S2 of the ceramic body 110 may be thicker than the second conductive carbon layer 173 disposed on the fifth surface S5 or the sixth surface S6, but the ratio t1'/t2' or t1'/t3' of thickness may not exceed 10.

Since the multilayer ceramic capacitor 1000 is classified based on its length and width, there may be a limit to increase the thickness of the first conductive carbon layer 171 and the first plated layer 180 disposed on the first surface S1 of the ceramic body 110 and the second conductive carbon layer 173 and the second plated layer 190 disposed on the second surface S2. Considering this, when the ratio t1/t2 or t1/t3 of thickness of the conductive carbon layers 171 and 173 disposed on the first surface S1 and the second surface S2 of the ceramic body 110 and the conductive carbon layers 171 and 173 disposed on the fifth surface S5 (or the sixth surface S6) exceeds 10, this may mean that an absolute thickness of the conductive carbon layers 171 and 173 disposed on the fifth surface S5 or the sixth surface S6 of the ceramic body 110 is very thin. When the conductive carbon layers 171 and 173 disposed on the fifth surface S5 or the sixth surface S6 of the ceramic body 110 are excessively thin, it is difficult to uniformly form the plated layers 180 and 190. Particularly in that case, the plated layer may not be sufficiently formed in a corner region where the fifth surface S5 or the sixth surface S6 of the ceramic body 110 meets the first surface S1 and the second surface S2.

The thicknesses t1, t2, t3, t1', t2', and t3' may be measured with reference to an optical microscope or scanning electron microscope (SEM) image of a cross section in the length direction (L-axis direction)-thickness direction (T-axis direction) at the central portion in the width direction W of the multilayer ceramic capacitor 1000. Other methods and/or tools appreciated by one of ordinary skill in the art, even if not described in the present disclosure, may also be used.

As in the present embodiment, when a plated layer is formed using a conductive carbon layer as a seed layer for plating growth, external electrodes may be formed with a uniform thickness. That is, a thickness deviation between the connection portion of the external electrode, the band portion, and the corner portion may be reduced, and the shape of the multilayer ceramic capacitor may be improved, thereby increasing the degree of design freedom in the length direction (L-axis direction).

In addition, according to the present embodiment, a conductive carbon layer may be disposed on the band portion of the external electrode. This prevents moisture from penetrating into the interior of the multilayer ceramic capacitor, thus ensuring its moisture resistant property and extending its life-span. Furthermore, resistance to flex crack due to warpage after mounting the multilayer ceramic capacitor on a substrate may be increased.

Unlike the present embodiment, if external electrodes are formed by dipping and blotting the ceramic body in the paste for forming external electrodes, a problem may occur that the thickness of the external electrode at the central portion of ceramic body in the thickness direction (T-axis direction) is thick, while the thickness of the external electrode at both ends in the thickness direction (T-axis direction) is thin. That is, since the external electrode may not be formed with a uniform thickness, various problems described above may occur.

Figure 5:
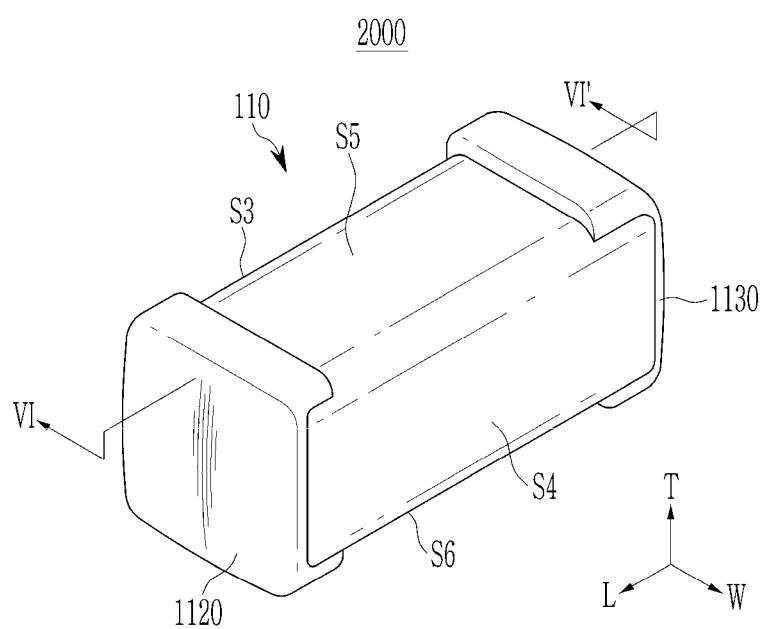
FIG. 5 is a perspective view schematically illustrating a multilayer ceramic capacitor according to another embodiment.
Figure 6:
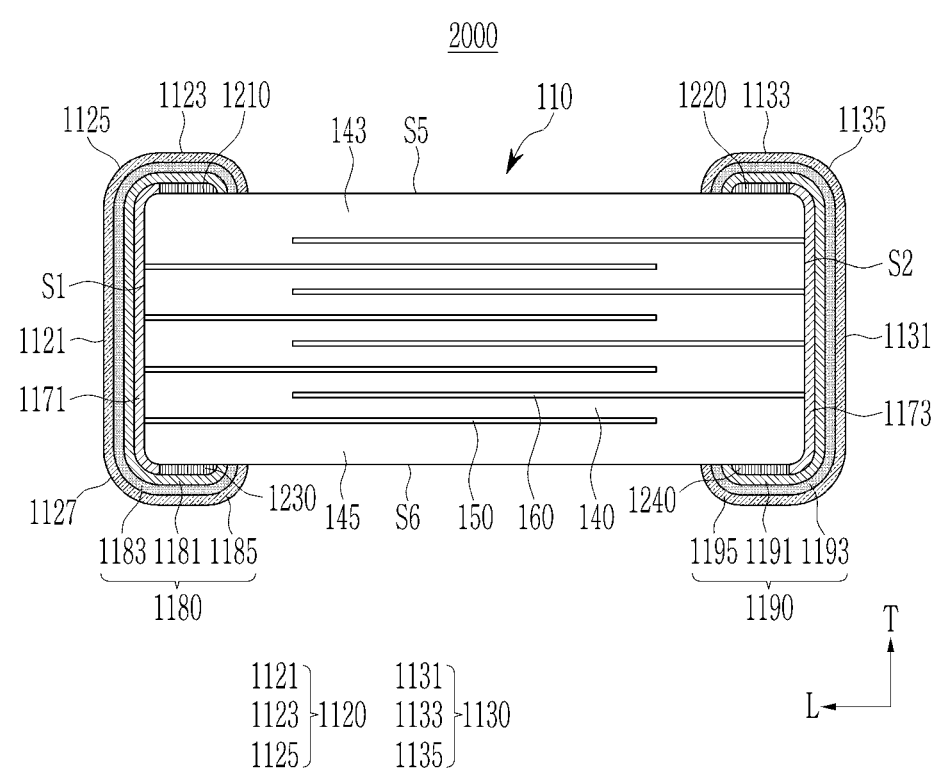
FIG. 6 is a cross-sectional view taken along line VI-VI' of FIG. 5.
Figure 7:
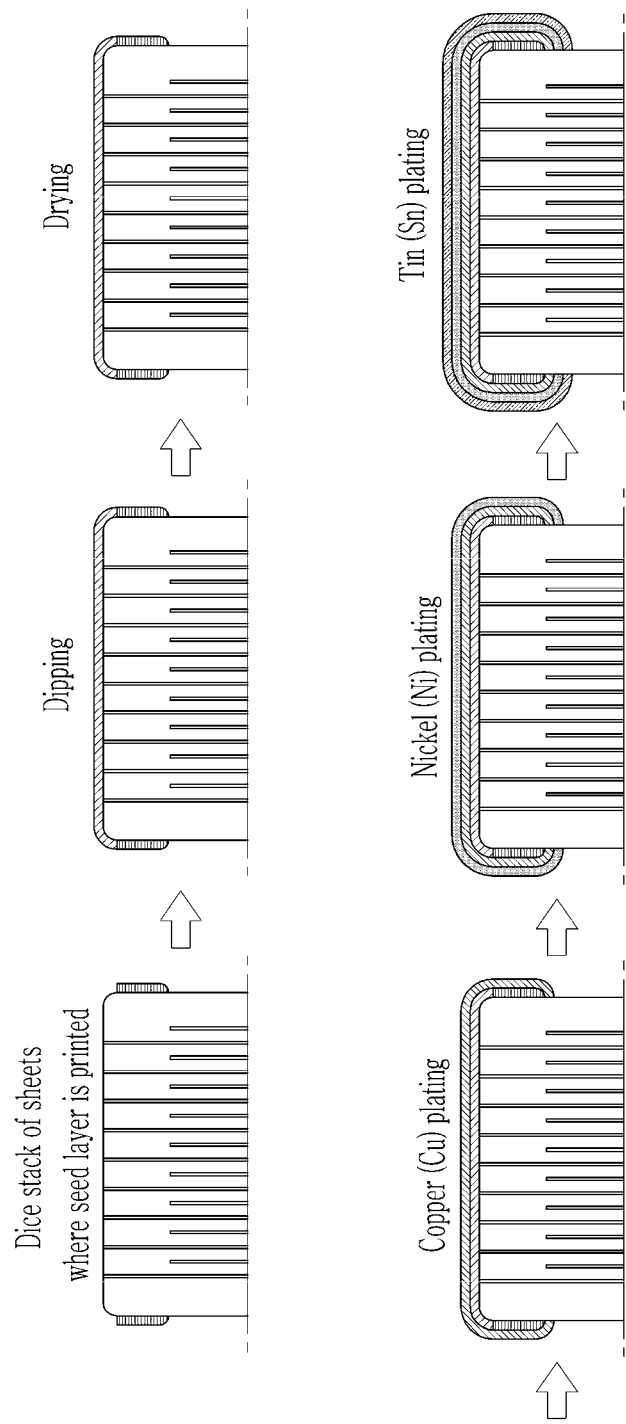
FIG. 7 is a drawing schematically illustrating a process of forming an external electrode of the multilayer ceramic capacitor of FIG. 5.

FIG. 5 is a perspective view schematically illustrating a multilayer ceramic capacitor according to another embodiment. FIG. 6 is a cross-sectional view taken along line VI-VI' of FIG. 5. FIG. 7 is a drawing schematically illustrating a process of forming an external electrode of a multilayer ceramic capacitor of FIG. 5. For ease of description, a process of forming only one external electrode of a multilayer ceramic capacitor is shown in FIG. 7, but it may be understood that the other external electrode may be formed by the same process.

Referring to FIG. 5, FIG. 6, and FIG. 7, a multilayer ceramic capacitor 2000 includes a ceramic body 110, a first external electrode 1120, a second external electrode 1130, a plurality of first internal electrodes 150 and a plurality of second internal electrodes 160.

The first external electrode 1120 may be disposed on the first surface S1 of the ceramic body 110, and may extend to the fifth surface S5 and the sixth surface S6. That is, the first external electrode 1120 may be disposed on the first surface S1, the fifth surface S5 and the sixth surface S6 of the ceramic body 110. However, since the present embodiment is not limited thereto, the first external electrode 1120 may be disposed on the first surface S1 and the fifth surface S5 of the ceramic body 110, or may be disposed on the first surface S1 and the sixth surface S6. The first external electrode 1120 is not disposed on the third surface S3 and the fourth surface S4 of the ceramic body 110.

The second external electrode 1130 may be disposed on the second surface S2 of the ceramic body 110, and may extend to the fifth surface S5 and the sixth surface S6. That is, the second external electrode 1130 may be disposed on the second surface S2, the fifth surface S5 and the sixth surface S6 of the ceramic body 110. However, since the present embodiment is not limited thereto, the second external electrode 1130 may be disposed on the second surface S2 and the fifth surface S5 of the ceramic body 110, or may be disposed on the second surface S2 and the sixth surface S6. The second external electrode 1130 is not disposed on the third surface S3 and the fourth surface S4 of the ceramic body 110.

The first external electrode 1120 may include the first conductive carbon layer 1171, a first metal layer 1210, a third metal layer 1230, and a third plated layer 1180.

The first conductive carbon layer 1171 is disposed on the first surface S1 of the ceramic body 110. The first conductive carbon layer 1171 does not extend from the first surface S1 of the ceramic body 110 to another surface. That is, the first conductive carbon layer 1171 is not disposed on the third surface S3, the fourth surface S4, the fifth surface S5, and the sixth surface S6 of the ceramic body 110.

The first conductive carbon layer 1171 may be connected to an end portions of the plurality of first internal electrodes 150.

The first metal layer 1210 is disposed on the fifth surface S5 of the ceramic body 110, and the third metal layer 1230 is disposed on the sixth surface S6 of the ceramic body 110.

The first metal layer 1210 may cover a portion of the fifth surface S5 at a point spaced apart from a central portion of the fifth surface S5 of the ceramic body 110 in a direction toward the first surface S1. For example, the first metal layer 1210 may contact an edge toward the first surface S1, an edge toward the third surface S3, and an edge toward the fourth surface S4, of the fifth surface S5 of the ceramic body 110, and may cover a portion of the fifth surface S5.

The third metal layer 1230 may cover a portion of the sixth surface S6 at a point spaced apart from a central portion of the sixth surface S6 of the ceramic body 110 in a direction toward the first surface S1. For example, the third metal layer 1230 may contact an edge toward the first surface S1, an edge toward the third surface S3, and an edge toward the fourth surface S4, of the sixth surface S6 of the ceramic body 110, and may cover a portion of the sixth surface S6.

The first metal layer 1210 and the third metal layer 1230 may be formed, for example, in the following method.

A stack of sheets is formed by overlapping ceramic green sheets with internal electrodes formed on the surface, and then a conductive paste is printed on the surface of the stack of sheets to form a metal pattern. For example, a conductive paste containing nickel (Ni), copper (Cu), nickel (Ni) alloy, or copper (Cu) alloy is applied to the stack of sheets by screen printing or gravure printing, to form the metal pattern. However, the present embodiment is not limited thereto. A green chip is manufactured by dicing the stack of sheets on which a metal pattern is formed. During this dicing process, the metal pattern may be diced to form the first metal layer and the third metal layer, respectively.

An edge toward the first surface S1 of the first metal layer 1210 may contact the first conductive carbon layer 1171. Here, the first metal layer 1210 and the first conductive carbon layer 1171 may have a continuous interface. Accordingly, a surface of the ceramic body 110 may not be exposed between the first metal layer 1210 and the first conductive carbon layer 1171.

The interface of the first metal layer 1210 and the first conductive carbon layer 1171 may exist in a first corner portion 1125 between the first surface S1 and the fifth surface S5 of the ceramic body 110, but is not limited thereto. For example, the boundary of the first metal layer 1210 and the first conductive carbon layer 1171 may exist on the interface of the first corner portion 1125 and the fifth surface S5. However, since the first conductive carbon layer 1171 is disposed on the first surface S1 of the ceramic body 110, the interface of the first metal layer 1210 and the first conductive carbon layer 1171 is not formed on the first surface S1 of the ceramic body 110.

An edge toward the first surface S1 of the third metal layer 1230 may contact the first conductive carbon layer 1171. Here, the third metal layer 1230 and the first conductive carbon layer 1171 may have a continuous interface. Accordingly, the surface of the ceramic body 110 may not be exposed between the third metal layer 1230 and the first conductive carbon layer 1171.

The interface of the third metal layer 1230 and the first conductive carbon layer 1171 may exist in a third corner portion 1127 between the first surface S1 and the sixth surface S6 of the ceramic body 110, but is not limited thereto. For example, the interface of the third metal layer 1230 and the first conductive carbon layer 1171 may exist on the interface of the third corner portion 1127 and the sixth surface S6. However, since the first conductive carbon layer 1171 is disposed on the first surface S1 of the ceramic body 110, the interface of the third metal layer 1230 and the first conductive carbon layer 1171 is not formed on the first surface S1 of the ceramic body 110.

The first conductive carbon layer 1171, the first metal layer 1210, and the third metal layer 1230 may be covered by the third plated layer 1180. That is, the first conductive carbon layer 1171 on the first surface S1, the first metal layer 1210 on the fifth surface S5, and the third metal layer 1230 on the sixth surface S6 of the ceramic body 110 may be covered by the third plated layer 1180 at the same time.

The third plated layer 1180 may be formed by directly plating a conductive metal on the first conductive carbon layer 1171, the first metal layer 1210, and the third metal layer 1230. That is, the first conductive carbon layer 1171, the first metal layer 1210, and the third metal layer 1230 may serve as a seed layer for plating. Here, the conductive metal may include nickel (Ni), copper (Cu), tin (Sn), palladium (Pd), platinum (Pt), gold (Au), silver (Ag), tungsten (W), titanium (Ti), lead (Pb), or the like, alone or an alloy thereof, but the present embodiment is not limited thereto.

The third plated layer 1180 may be formed of a plurality of layers. For example, the third plated layer 1180 may include a first layer 1181 covering all of the first conductive carbon layer 1171, the first metal layer 1210, and the third metal layer 1230, and a second layer 1183 covering the first layer 1181, and a third layer 1185 covering the second layer 1183.

The first layer 1181 may include copper (Cu), the second layer 1183 may include nickel (Ni), and the third layer 185 may include tin (Sn), but the present embodiment is not limited thereto.

The second external electrode 1130 may include the second conductive carbon layer 1173, a second metal layer 1220, a fourth metal layer 1240, and a fourth plated layer 1190. Except for the position, the second external electrode 1130 has the same structure and components as the first external electrode 1120, and a redundant description of the second external electrode 1130 will be omitted.

Referring to FIG. 7, after forming the first metal layer 1210 (and/or the third metal layer 1230) on the fifth surface S5 (and/or the sixth surface S6) of the ceramic body 110 by manufacturing the green chip by dicing the stack of sheets with the metal pattern printed and firing the green chip, the first conductive carbon layer 1171 (and the second conductive carbon layer 1173) may be formed on the first surface S1 (and the second surface S2) of the ceramic body 110. For example, a ceramic body is partially dipped in a dispersion containing a conductive carbon material to be applied according to the degree of dilution of the solution, dried at 170° C. for 10 minutes, and cured to form a solid conductive carbon layer to a thickness of about 0.05 μm or more and 20 μm or less. Here, by setting the dilution ratio such that the content of the solid contents of the solution containing the conductive carbon material is approximately 1 wt % to 20 wt %, and by adjusting the number of repetitions of the dipping and drying process, the thickness of the conductive carbon layer may be adjusted. Subsequently, the third plated layer 1180 may be formed by directly plating the conductive metal on the first conductive carbon layer 1171, the first metal layer 1210, and the third metal layer 1230. For example, the third plated layer 1180 may be formed by electroplating copper (Cu). Here, the first conductive carbon layer 1171, the first metal layer 1210, and the third metal layer 1230 may serve as a seed layer for plating. Since the first conductive carbon layer 1171 is disposed on the first surface S1 of the ceramic body 110, the first metal layer 1210 is disposed on the fifth surface S5, and the third metal layer 1230 is disposed on the sixth surface S6, the third plated layer 1180 is not formed on the third surface S3 and the fourth surface S4 of the ceramic body 110. Thus, the first external electrode 1120 and the second external electrode 1130 is not disposed on the third surface S3 and the fourth surface S4 of the ceramic body 110.

In the present embodiment, since the first external electrode 1120 is not disposed on the third surface S3 and the fourth surface S4 of the ceramic body 110, the width of the ceramic body 110 may be increased accordingly. When the width of the ceramic body 110 is increased, the width of the internal electrode, which affects the capacitance, may also be increased by a corresponding amount, and thus the capacitance of the multilayer ceramic capacitor may be increased.

Hereinafter, specific embodiments are proposed. However, the following described examples are provided only for illustrating the disclosure more specifically, and thus the scope of the disclosure should not be limited by these examples.

Manufacturing Example: Manufacture of Multilayer Ceramic Capacitor

Embodiment

A paste containing barium titanate ($BaTiO_3$) powder is applied on a carrier film and then dried, to manufacture a plurality of dielectric green sheets.

A conductive paste containing nickel (Ni) is applied on the dielectric green sheet by using screen printing to form a conductive paste layer.

A dielectric green sheet stack is manufactured by stacking a plurality of dielectric green sheets while overlapping at least a portion of the conductive paste layers.

After the dielectric green sheet stack is cut into individual chips, a binder is removed by maintaining at 350° C. for 66 hours in an air atmosphere, and a ceramic body is manufactured by sintering at 1,165° C.

Subsequently, a conductive carbon layer having a thickness of about 3 μm is formed by partially dipping the ceramic body in a conductive carbon material dispersion containing 10 wt % of carbon black for 1 minute and heat-drying at 170° C. for 10 minutes.

Subsequently, electroplating of copper (Cu) is performed using the conductive carbon layer as a seed layer to form a copper (Cu) plated layer.

Thereafter, plating of nickel (Ni) and tin (Sn) is performed, and heat treatment is performed at 160° C. for 1 hour to manufacture a multilayer ceramic capacitor.

Comparative Example

A paste containing barium titanate ($BaTiO_3$) powder is applied on a carrier film and then dried, to manufacture a plurality of dielectric green sheets.

A conductive paste containing nickel (Ni) is applied on the dielectric green sheet by using screen printing to form a conductive paste layer.

A dielectric green sheet stack is manufactured by stacking a plurality of dielectric green sheets while overlapping at least a portion of the conductive paste layers.

After the dielectric green sheet stack is cut into individual chips, a binder is removed by maintaining at 350° C. for 66 hours in an air atmosphere, and a ceramic body is manufactured by sintering at 1,165° C.

Subsequently, the ceramic body is dipped and blotted in a slurry containing a glass frit and copper (Cu) to be applied to a thickness of about 40 μm or less, then heat-dried, and sintered at 820° C. for 60 minutes, to form a metal layer.

Thereafter, plating of nickel (Ni) and tin (Sn) is performed to manufacture a multilayer ceramic capacitor.

Experimental Example: Performance of Multilayer Ceramic Capacitor

The thickness of the external electrode, moisture resistance, capacitance (C) and dissipation factor (Df) of a multilayer ceramic capacitor manufactured according to an Embodiment and a Comparative example are measured.

1) Method for Measuring the Thickness of External Electrode

Five items of the manufactured multilayer ceramic capacitor are mounted on an epoxy mold, the surface in the L-axis direction and the T-axis direction is polished about ½ depth along the W-axis direction, and finished with diamond paste to prepare a cross-section sample.

In the prepared cross-sectional sample, a position at which both the first or second electrode are visible, about 70 μm in a direction from an interface between the ceramic body and the first or second external electrode to an outer surface of the plated layer, is measured by metallurgical optical microscope (OM), in the Bright Field mode with analysis magnification ratio of 500.

2) Method for Measuring Moisture Resistance

Solder cream is patterned using a stencil mask on a 40-channel moisture-resistant PCB board. Thereafter, a reflow process is performed at a maximum temperature of 260° C., and the prepared specimen is mounted on the PCB board. The prepared PCB board is mounted in a slot capable of measuring potential difference and current, and is put into a chamber with a temperature of 85° C. and a humidity of 85% RH. Thereafter, a potential difference of 16V is applied to both ends of the specimen to measure the moisture resistance by checking the level at which the insulation resistance (IR) is deteriorated in two steps of 1 hour each.

3) Method for Measuring Capacitance and Dissipation Factor

The capacitance and dissipation factor of the manufactured multilayer ceramic capacitor were measured using a Keysight 4268A LCR meter under input voltage conditions of 500 mV and 120 Hz without additional aging time.

The results of measuring the thickness of the extremal electrode, the moisture resistance, the capacitance (C) and the dissipation factor (Df) of a multilayer ceramic capacitor manufactured according to an Embodiment and a Comparative example are shown in Table 1.

TABLE 1

| | | Embodiment | Comparative Example |
|---|---|---|---|
| Thickness of external electrode (μm) | Connection portion | 12.3 at maximum | 43.08 at maximum |
| | Band portion | 10.1 at maximum | 29.05 at maximum |
| | Corner portion | 7.2 at maximum | 4.68 at maximum |
| Moisture resistance (85° C./85% RH) | Insulation resistance (IR) deterioration | Good 15/15 (>$10^7 \Omega$) | Good 15/15 (>$10^7 \Omega$) |
| | C (μF) | 48 in average | 48 in average |
| | Df (%) | 4.8 in average | 4.5 in average |

Referring to table 1, it can be confirmed that a thickness of an external electrode in a connection portion of a multilayer ceramic capacitor manufactured according to an Embodiment is 12.3 μm at maximum, a thickness of an external electrode in a band portion is 10.1 μm at maximum, and a thickness of an external electrode in a corner portion is 7.2 μm at maximum. On the other hand, it can be confirmed that a thickness of an external electrode in a connection portion of a multilayer ceramic capacitor manufactured based on the copper (Cu) paste in the Comparative example is 43.08 μm at maximum, a thickness of an external electrode in a band portion is 29.05 μm at maximum, and a thickness of an external electrode in a corner portion is 4.68 μm at maximum. As such, the thicknesses of a connection portion, a band portion, and a corner portion of an external electrode of a multilayer ceramic capacitor manufactured according to an Embodiment are smaller than the thicknesses of a connection portion, a band portion, and an corner portion of an external electrode of a multilayer ceramic capacitor manufactured according to a Comparative example, respectively. In addition, thicknesses of external electrodes at the connection portion, the band portion, and the corner portion of the multilayer ceramic capacitor manufactured according to an Embodiment have relatively smaller deviation, in comparison to thicknesses of external electrodes at the connection portion, the band portion, and the corner portion of the multilayer ceramic capacitor manufactured according to a Comparative example.

In short, the external electrode of a multilayer ceramic capacitor manufactured according to an Embodiment is more uniform and thinner than the external electrode of a multilayer ceramic capacitor manufactured according to a Comparative example.

In addition, it can be confirmed that the capacitance (C) and the dissipation factor (Df) of the multilayer ceramic capacitor manufactured according to an Embodiment are at a similar level to the capacitance (C) and the dissipation factor (Df) of the multilayer ceramic capacitor manufactured according to a Comparative example.

Accordingly, if the size of the multilayer ceramic capacitors is the same, according to the embodiment, the external electrodes may be thinner, and the volume of portions contributing to the capacitance, such as internal electrodes and dielectric layers, may be larger. That is, according to an embodiment, a portion contributing to the capacitance may be enlarged by reducing the volume of an external electrode without relative electrical loss.

Meanwhile, the moisture resistance of the multilayer ceramic capacitor manufactured according to an Embodiment is good, and is equivalent to the moisture resistance of the multilayer ceramic capacitor manufactured according to a Comparative example. This shows that the conductive carbon layer in the embodiment does not act as a passage for moisture permeation.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A multilayer ceramic capacitor, comprising:
    a ceramic body comprising a first surface and a second surface facing each other in a first direction, a third surface and a fourth surface facing each other in a second direction and connecting the first surface and the second surface, a fifth surface and a sixth surface facing each other in a third direction and connecting the first surface and the second surface;
    a plurality of first internal electrodes and a plurality of second internal electrodes disposed inside the ceramic body;
    a first external electrode disposed on the ceramic body and connected to the plurality of first internal electrodes, the first external electrode comprising a first conductive carbon layer connected to the plurality of first internal electrodes on the first surface of the ceramic body and extending to at least one surface among the third surface, the fourth surface, the fifth surface, and the sixth surface, and a first plated layer covering the first conductive carbon layer; and
    a second external electrode disposed on the ceramic body and connected to the plurality of second internal electrodes, the second external electrode comprising a second conductive carbon layer connected to the plurality of second internal electrodes on the second surface of the ceramic body and extending to at least one surface among the third surface, the fourth surface, the fifth surface, and the sixth surface, and a second plated layer covering the second conductive carbon layer,
    wherein end portions of the plurality of first internal electrodes are exposed through the first surface of the ceramic body, and end portions of the plurality of second internal electrodes are exposed through the second surface of the ceramic body, and
    wherein the first conductive carbon layer is in direct contact with the first surface of the ceramic body between the exposed end portions of the plurality of first internal electrodes, and the second conductive carbon layer is in direct contact with the second surface of the ceramic body between the exposed end portions of the plurality of second internal electrodes.

2. The multilayer ceramic capacitor of claim 1, wherein the first conductive carbon layer and the second conductive carbon layer comprise one or more selected from graphite, graphene, carbon nanotube, fullerene, and carbon black.

3. The multilayer ceramic capacitor of claim 1, wherein the first plated layer comprises:
    a first layer covering the first conductive carbon layer;
    a second layer covering the first layer; and
    a third layer covering the second layer.

4. The multilayer ceramic capacitor of claim 3, wherein:
    the first layer comprises copper (Cu);
    the second layer comprises nickel (Ni); and
    the third layer comprises tin (Sn).

5. The multilayer ceramic capacitor of claim 1, wherein the second plated layer comprises:
    a first layer covering the second conductive carbon layer;
    a second layer covering the first layer; and
    a third layer covering the second layer.

6. The multilayer ceramic capacitor of claim 5, wherein:
    the first layer comprises copper (Cu);
    the second layer comprises nickel (Ni); and
    the third layer comprises tin (Sn).

7. The multilayer ceramic capacitor of claim 1, wherein:
    a thickness of the first conductive carbon layer is 0.1 µm or more and 20 µm or less; and
    a thickness of the second conductive carbon layer is 0.1 µm or more and 20 µm or less.

8. The multilayer ceramic capacitor of claim 1, wherein the first conductive carbon layer has:
    a portion having a first thickness t1 and contacting the first surface of the ceramic body,
    a portion having a second thickness t2 and contacting the fifth surface, and
    a portion having a third thickness t3 and contacting the sixth surface; and $$0 < t1 \leq 10 * t2 \text{ and } 0 < t1 \leq 10 * t3.$$

9. The multilayer ceramic capacitor of claim 1, wherein the second conductive carbon layer has:
    a portion having a first thickness t1' and contacting the second surface of the ceramic body,
    a portion having a second thickness t2' and contacting the fifth surface, and
    a portion having a third thickness t3' and contacting the sixth surface; and $$0 < t1' \leq 10 * t2' \text{ and } 0 < t1' \leq 10 * t3'.$$

10. A multilayer ceramic capacitor, comprising:
a ceramic body comprising a first surface and a second surface facing each other in a first direction, a third surface and a fourth surface facing each other in a second direction and connecting the first surface and the second surface, a fifth surface and a sixth surface facing each other in a third direction and connecting the first surface and the second surface,
a plurality of first internal electrodes and a plurality of second internal electrodes disposed inside the ceramic body,
a first external electrode disposed on the ceramic body and connected to the plurality of first internal electrodes, the first external electrode comprising:
a first conductive carbon layer disposed on the first surface of the ceramic body and connected to the plurality of first internal electrodes; and
a first metal layer disposed on the fifth surface of the ceramic body and having an edge toward the first surface, the edge contacting the first conductive carbon layer, and
a second external electrode disposed on the ceramic body and connected to the plurality of second internal electrodes, the second external electrode comprising:
a second conductive carbon layer disposed on the second surface of the ceramic body and connected to the plurality of second internal electrodes; and
a second metal layer disposed on the fifth surface of the ceramic body and having an edge toward the second surface, the edge contacting the second conductive carbon layer.

11. The multilayer ceramic capacitor of claim 10, wherein the first conductive carbon layer and the second conductive carbon layer comprise one or more selected from graphite, graphene, carbon nanotube, fullerene, and carbon black.

12. The multilayer ceramic capacitor of claim 10, wherein:
the first external electrode further comprises a third plated layer covering the first conductive carbon layer and the first metal layer; and
the second external electrode further comprises a fourth plated layer covering the second conductive carbon layer and the second metal layer.

13. The multilayer ceramic capacitor of claim 12, wherein:
the first external electrode further comprises a third metal layer disposed on the sixth surface of the ceramic body and having an edge toward the first surface, the edge contacting the first conductive carbon layer; and
the second external electrode further comprises a fourth metal layer disposed on the sixth surface of the ceramic body and having an edge toward the second surface, the edge contacting the second conductive carbon layer.

14. The multilayer ceramic capacitor of claim 13, wherein:
the third metal layer is covered by the third plated layer; and
the fourth metal layer is covered by the fourth plated layer.

15. The multilayer ceramic capacitor of claim 12, wherein the third plated layer comprises:
a first layer covering the first conductive carbon layer;
a second layer covering the first layer; and
a third layer covering the second layer.

16. The multilayer ceramic capacitor of claim 15, wherein:
the first layer comprises copper (Cu);
the second layer comprises nickel (Ni); and
the third layer comprises tin (Sn).

17. The multilayer ceramic capacitor of claim 12, wherein the fourth plated layer comprises:
a first layer covering the second conductive carbon layer;
a second layer covering the first layer; and
a third layer covering the second layer.

18. The multilayer ceramic capacitor of claim 17, wherein:
the first layer comprises copper (Cu);
the second layer comprises nickel (Ni); and
the third layer comprises tin (Sn).

* * * * *